(12) United States Patent
Grandhee et al.

(10) Patent No.: US 7,732,041 B2
(45) Date of Patent: *Jun. 8, 2010

(54) DECORATIVE INK FOR AUTOMOTIVE PLASTIC GLAZING

(75) Inventors: Sunitha Grandhee, Novi, MI (US); Keith D. Weiss, Fenton, MI (US); Hua Ning, Rochester, MI (US)

(73) Assignee: Exatec LLC, Wixom, MI (US)

( * ) Notice: Subject to any disclaimer, the term of this patent is extended or adjusted under 35 U.S.C. 154(b) by 1281 days.

This patent is subject to a terminal disclaimer.

(21) Appl. No.: 10/909,880

(22) Filed: Aug. 2, 2004

(65) Prior Publication Data

US 2006/0025496 A1 Feb. 2, 2006

(51) Int. Cl.
B32B 7/14 (2006.01)
B32B 5/16 (2006.01)

(52) U.S. Cl. .................... 428/204; 428/195.1; 428/212; 428/213; 428/217; 428/220

(58) Field of Classification Search ............. 428/195.1, 428/204, 212, 213, 217, 220
See application file for complete search history.

(56) References Cited

U.S. PATENT DOCUMENTS

| 4,896,598 | A | | 1/1990 | Leech, Jr. | |
|---|---|---|---|---|---|
| 4,996,252 | A | | 2/1991 | Phan et al. | |
| 5,039,339 | A | | 8/1991 | Phan et al. | |
| 5,452,658 | A | | 9/1995 | Shell | |
| 5,530,581 | A | * | 6/1996 | Cogan ........................ | 359/265 |
| 5,648,414 | A | | 7/1997 | Bier et al. | |
| 5,766,739 | A | | 6/1998 | Funaki et al. | |
| 6,132,861 | A | * | 10/2000 | Kang et al. ................ | 428/323 |
| 6,309,755 | B1 | | 10/2001 | Matsco et al. | |
| 6,465,101 | B1 | | 10/2002 | MacGregor et al. | |
| 6,534,128 | B1 | * | 3/2003 | Carlson et al. .............. | 427/466 |
| 6,958,189 | B2 | * | 10/2005 | Weiss et al. .................. | 428/412 |
| 2004/0191521 | A1 | | 9/2004 | Weiss et al. | |
| 2005/0137355 | A1 | * | 6/2005 | Buckanin et al. ............ | 525/374 |
| 2005/0202184 | A1 | | 9/2005 | Iacovangelo et al. | |
| 2005/0205200 | A1 | * | 9/2005 | Flosbach et al. ............ | 156/233 |
| 2008/0085415 | A1 | * | 4/2008 | Li et al. ....................... | 428/412 |

FOREIGN PATENT DOCUMENTS

| EP | 0688839 | | 7/1997 |
|---|---|---|---|
| EP | 1031596 | A1 | 8/2000 |
| JP | 05294079 | A | 11/1993 |
| WO | WO 9001048 | A1 | 2/1990 |
| WO | WO 9004006 | A1 | 4/1990 |
| WO | WO 9734768 | | 9/1997 |
| WO | WO 00/78520 | A1 | 12/2000 |
| WO | WO 0250186 | A1 | 6/2002 |
| WO | WO 2004/092288 | A1 | 10/2004 |

OTHER PUBLICATIONS

Nazdar, "Nazdar Introduces 8400 Series CVIM In-Mold Decorating Inks", Aug. 2001, available at www.nazdar.com.*
Engineering Materials entitled, "Polycarbonate makes more headway in vehicle glazing," British Plastics & Rubber, [online] Nov. 2005, p. 26, XP-002444629, http://www.polymer-age.co.uk/back_issues/nov05/engmats.pdf.
International Search Report—PCT/US2007/006147 (Aug. 13, 2007).
Publication entitled "Ink Formulations", pp. 205-219, by Jan W. Gooch, Plenum Press, NY (1997).
Publication Surface Phenomena and Latexes in Waterborne Coating and Printing Technology, by M.K. Sharma, Plenum Press, NY (1995).
Journal of Electronics Manufacturing, vol. 9, No. 3 (Sep. 1999) 203-213, entitled "Screen Printing Process Design of Experiments for Fine Line Printing of Thick Film Ceramic Substrates".
SGIA Journal Fourth Quarter 1999, pp. 28, 30, 32,34, 36, entitled "SPTF'S New Picture of the Screen Printing Process".
Screenprinting publication (May 2002) entitled "Understanding The Variables Of Plastisol Printing" by Mike Ukena.
Website "ScreenWeb" entitled "Inks For Pad Printing" (Mar. 25, 2002).
Pad Printing Article, entitled "Understanding and Using Pad Printing Inks" by Peter Kiddell, pp. 1-9.
Publication from Solar Energy Materials & Solar Cells, (2001 Elsevier Science B.V.) entitled "Progress in Thick-Film Pad Printing Technique for Solar Cells", pp. 399-407.
Publication from Plastics Engineering, entitled "Pad Printing Impresses The Plastics Industry" (Jun. 1987) by Heinz Grob.

* cited by examiner

*Primary Examiner*—Mark Ruthkosky
*Assistant Examiner*—David J Joy
(74) *Attorney, Agent, or Firm*—Brinks Hofer Gilson & Lione

(57) ABSTRACT

The present invention involves an automotive glazing panel having an ink that adheres to a plastic substrate and is compatible with a hard-coat system. The plastic substrate comprises an ink printed thereon and a hard-coat system applied on the ink. The ink has a synthetic resin which is a polycarbonate resin, a polyester resin or mixtures thereof. The hard-coat system includes a solvent having greater than 10 weight percent water and includes either a glycol ether, a ketone, an alcohol or an acetate. The ink is adaptable to adhere to the surface of the substrate and be compatible with the hard coat system.

13 Claims, 3 Drawing Sheets

DECORATIVE INK FOR AUTOMOTIVE PLASTIC GLAZING

TECHNICAL FIELD

The present invention relates to an automotive glazing panel having a printed ink that adheres to a transparent plastic substrate and is compatible with a primer/hard-coat system.

BACKGROUND

Plastic materials are being used in a number of automotive engineering applications to enhance vehicle styling. For example, plastic materials are currently used in the manufacturing of such parts and components as B-pillars, headlamps, and sunroofs. An emerging application for transparent plastic materials is automotive window systems. When a transparent plastic material is used to manufacture automotive windows, it is a manufacturing requirement that such windows have identification markings. The perimeter of a window often must be marked with an opaque fade-out border to enhance the appearance of the installed window. Additionally, it is also a manufacturing requirement that windows are coated to make them scratch resistant.

In order to mark such plastic window surfaces with information and a fade-out border, inks that are used must not only adhere to the window surface but must also be compatible with any primer/coating systems that are applied to its surface for abrasion and ultra-violet (UV) protection. Any ink used to mark the surface of a plastic window must not be softened, damaged, or removed during the application of the protective coating system. The inks must also be able to survive the rigorous testing required to qualify the product by the automotive industry.

Therefore, there is a need in the industry to formulate inks that not only adhere to a plastic window surface but also are compatible to any primer/coating systems that are used to protect the plastic window surface.

SUMMARY

The present invention provides an automotive glazing panel. In one embodiment, the automotive glazing panel comprises an ink printed on a transparent plastic substrate wherein the ink has a synthetic resin. The synthetic resin is preferably a polycarbonate resin, a polyester resin, or mixtures thereof. The transparent plastic substrate further includes a primer/hard-coat system applied on the ink and the remaining transparent surface of the plastic substrate. The primer/hard-coat system includes a first co-solvent having greater that 10 weight percent water and a second co-solvent selected from the group consisting of the glycol ethers, ketones, alcohols, and acetates. In this embodiment, the ink is adaptable to adhere to the surface of the substrate and is compatible with the primer/hard-coat system.

In another embodiment, the ink comprises about 5 to 34 weight percent of a polyester resin obtained from a polyester ink and about 1 to 13 weight percent polycarbonate resin obtained from a polycarbonate ink. The polyester ink and the polycarbonate ink have a weight ratio of less than 100:0 and greater than about 50:50. The ink further includes about 0.1 to 5 weight percent isocyanate and a balance of a solvent mixture. In this embodiment, the transparent plastic substrate further includes a primer/hard-coat system applied to the ink so that the ink adheres to the surface of the plastic substrate and is compatible with the primer/hard-coat system.

In another embodiment, an automotive glazing panel comprising a transparent plastic substrate, an ink having a polycarbonate resin, a polyester resin, or a mixture thereof, and a primer/hard-coat system applied to the ink and the plastic substrate, whereby the primer contains at least 10% water as a solvent, has a top-coat applied on top of the primer/hard-coat system. In this embodiment the top-coat is preferably an abrasion resistant coating applied by plasma enhanced chemical vapor deposition, sputtering, or other vacuum deposition methods known to those skilled in the art.

DETAILED DESCRIPTION

Figure 1A:
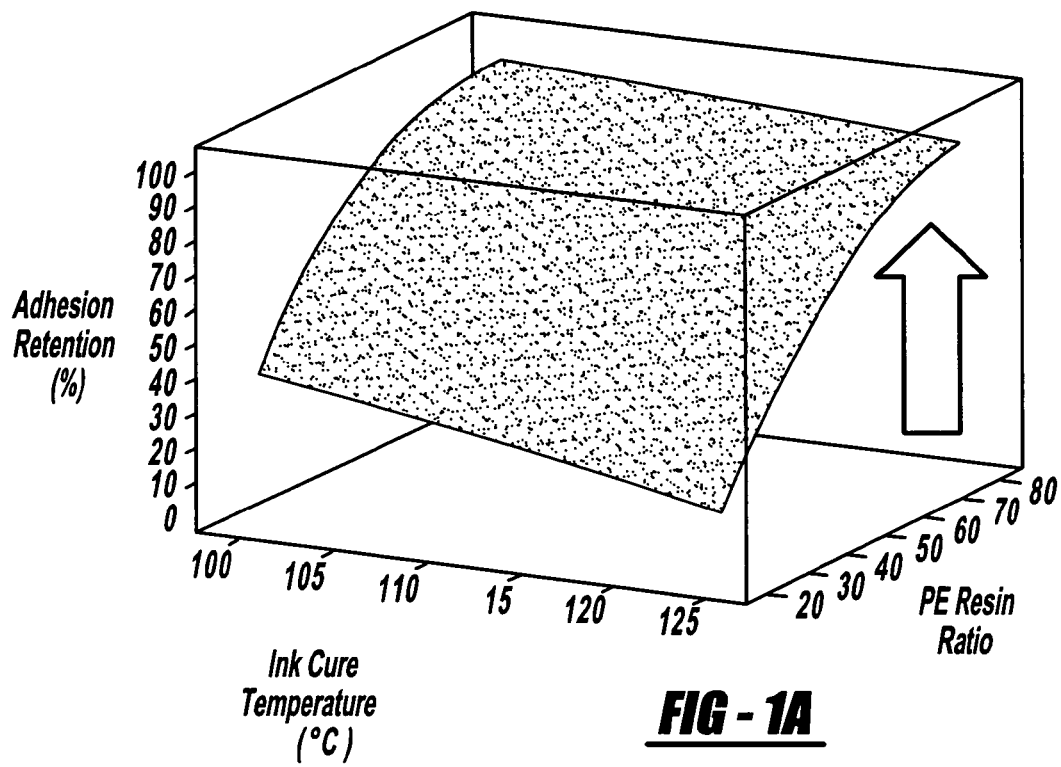
FIG. 1A is a plot of the response surface for polyester (PE) to polycarbonate (PC) resin ratio, ink cure temperature, and adhesion retention in water immersion testing.

The following description of the preferred embodiment is merely exemplary in nature and is in no way intended to limit the invention or its application or uses.

The present invention provides for an automotive glazing panel comprising a transparent plastic substrate and an ink printed on a surface of the plastic substrate. The transparent plastic substrate of the present invention may be comprised of but not limited to polycarbonate, acrylic, polyarylate, polyester, and polysulfone resins, as well as copolymers and mixtures thereof. Preferably, the transparent plastic substrate includes bisphenol-A polycarbonate and all other resin grades (such as branched or substituted) as well as being copolymerized or blended with other polymers such as PBT, ABS or polyethylene. The transparent plastic substrate may further be comprised of various additives, such as colorants, mold release agents, antioxidants, and ultraviolet absorbers (UVA), among others.

The ink printed on the surface of the transparent plastic substrate includes a synthetic resin group such that the ink adheres to the surface of the plastic substrate. Preferably, such synthetic resin groups are polyester-based resins or polycarbonate-based resins. The ink may be applied onto the surface of the transparent plastic substrate via screen printing, although other methods of printing known to those skilled in the art are acceptable, such as but not limited to mask/spray and tampon printing.

When such ink is applied to the transparent plastic substrate and specifically used for automotive application, the plastic substrate with the ink is typically coated with a coating system preferably a primer/hard-coat system. The coating system preferably comprises an acrylic primer and a silicone hard-coat. Alternatively, other primer/coating systems may be used. Therefore, the ink selected to be used in automotive applications not only adheres to the transparent plastic substrate, but also adheres to the primer used in the coating system. An example of such a primer includes Exatec® SHP 9X commercially available from Exatec LLC (Wixom, Mich.) and distributed by General Electric Silicones (Waterford, N.Y.). In one preferred embodiment, the primer is coated on the transparent plastic substrate, air dried, and then thermally cured between about 80° C. and 130° C. for between about 20 to 80 minutes and more preferably at about 120° C. for about 60 minutes. A hard-coat is then applied over the primer layer and is air dried before curing at preferably between about 80° C. and 130° C. for between about 20 to 80 minutes and more preferably at about 100° C. for about 30 minutes. The preferred silicone hard-coat used in the present invention is available from Exatec LLC and distributed by General Electric Silicones as Exatec® SHX.

In a preferred embodiment of the present invention, the primer in the primer/hard coat system is a waterborne primer comprising water as the first solvent and an organic liquid as a second co-solvent. The first solvent, water, preferably comprises greater than 10 wt. % of the waterborne primer, more preferably greater than about 50 wt % of the waterborne primer, and most preferably greater than at least 80 wt. % of the waterborne primer. The general chemical classes associated with the second co-solvent present in the primer/hard-coat system includes glycol ethers, ketones, alcohols and acetates with the co-solvent being present in less 90 wt % of the waterborne primer, more preferably less than about 50 wt % of the waterborne primer, and most preferably less than about 20 wt % of the waterborne primer. For example, the second co-solvent present in the Exatec® SHP 9X primer is 2-butoxyethanol (also called ethylene glycol monobutyl ether). Resin content in these acrylic primers is typically about 2-7 wt % of the primer with the remainder of the primer being made up of the first solvent and second co-solvent. Preferably, the acrylic resin in these primers is polymethyl methacrylate. The acrylic resin may be present as a water soluble, dispersable, or reducible resin. Other polymeric resins may be utilized in the primer provided that the solvent system for this primer is similar to that described above. The primer may contain other additives, such as but not limited to surfactants, antioxidants, biocides, and drying agents, among others.

Alternatively, a primerless hard-coat may be used provided that the solvent system for this primerless hard-coat is similar to that described above for a waterborne primer. In this embodiment, the ink selected not only adheres to the transparent plastic substrate, but also adheres to the primerless hard-coat. Preferably, the resin in the primerless hard-coat is a silicone resin with a methylsilsequioxane resin being specifically preferred. The primerless hard-coat, as well as the primer/hard-coat systems is applied to the transparent plastic substrate containing the printed ink pattern by dipping the plastic substrate in the coating at room temperature and atmospheric pressure through a process known to those skilled in the art as dip coating. Alternatively, the primer/hard-coat systems may be applied by flow coating, curtain coating, or spray processes or other processes known to those skilled in the art.

A topcoat that adds additional or enhanced functionality to the automotive glazing panel, such as improved abrasion resistance, may be optionally applied on top of the primer/hard-coat system. An example of such a coating is the abrasion resistant topcoat used in the Exatec® 900 glazing system. In the Exatec® 900 glazing system, the automotive glazing panel comprises a transparent polycarbonate substrate, an ink as discussed herein, a waterborne acrylic primer (Exatec® SHP 9X, Exatec LLC with GE Silicones), a silicone hard-coat (Exatec® SHX, Exatec LLC with GE Silicones), and a "glass-like" topcoat deposited using Plasma Enhanced Chemical Vapor Deposition. Specific examples of other possible topcoats include but are not limited to aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, silicon carbide, tantalum oxide, titanium oxide, tin oxide, indium tin oxide, yttrium oxide, zinc oxide, zinc selenide, zinc sulfide, zirconium oxide, zirconium titanate, or glass, and mixtures or blends thereof.

The optional topcoat may be applied by any technique known to those skilled in the art. These techniques include deposition from reactive species, such as those employed in vacuum-assisted deposition processes, and atmospheric coating processes, such as those used to apply sol-gel coatings to substrates. Examples of vacuum-assisted deposition processes include but are not limited to plasma enhanced chemical vapor deposition, ion assisted plasma deposition, magnetron sputtering, electron beam evaporation, and ion beam sputtering. Examples of atmospheric coating processes include but are not limited to curtain coating, spray coating, spin coating, dip coating, and flow coating.

The transparent plastic substrate may be formed into a window through the use of any known technique to those skilled in the art, such as extrusion, molding, which includes injection molding, blow molding, and compression molding, or thermoforming, which includes thermal forming, vacuum forming, and cold forming. The forming of a window using the transparent plastic substrate may occur prior to printing, after printing, or after application of the primer/hard-coat system.

In order for the ink to withstand the solvents used in the primer or primerless hard-coat, it is important that the synthetic resins used in the ink formulations are capable of cross-linking after being applied to the plastic surface. In order to test if the ink can withstand exposure to the solvents in the primer or hard-coat, the ink is subjected to a "compatibility test." In this embodiment, the ink is considered compatible with the coating system hence acceptable, if the ink is not chemically or physically affected by the primer or primerless hard-coat. Chemical and physical effects are quantified by observing if the ink immediately after the application of the coating system onto the printed plastic substrate either "bleeds" or is softened to the point where it can easily be removed from the substrate via rubbing; or if the applied primer "crawls" during application. A coating will crawl when a surface energy/surface tension gradient causes the coating to ineffectively wet the surface of the dried ink print. In other words, if the ink does not bleed or rub-off of the substrate after being exposed to the primer/hard-coat system or if the primer does not crawl during application, the ink may be used on the plastic substrate and acceptable for applying a primer/hard-coat system.

The inventors conducted experiments to test the compatibility of inks with a plastic substrate, such as polycarbonate, and a waterborne primer/hard-coat system. The inventors discovered that most synthetic resin inks, which included single component, plural component, and radiation curable resins with good adhesion to plastics (e.g., polycarbonate), were compatible with a waterborne primer/hard-coat system. Such single component inks include but are not limited to acrylic resin inks, acrylic/nitrocellulose resin inks, nitrocellulose/polyamide resin inks, vinyl/acrylic resin inks, alkyd resin inks, vinyl/polyester resin inks, vinyl resin inks, polycarbonate resin inks, and polyester resin inks. Plural component inks include epoxy resin inks, acrylic resin inks, polyester resin inks, and polyurethane resin inks among others. Radiation curable inks include acrylate resin inks.

After the ink is subjected to the "compatibility test," the ink also has to pass additional tests that have been specified by automotive original equipment manufacturers (OEM). Such tests include a water immersion test at elevated temperatures, and a Cataplasma-Like or a full Cataplasma test. Unless the ink passes all the tests specified, the transparent plastic substrate can not be used in the assembled motor vehicle as automotive plastic glazing.

The water immersion test includes an initial cross-hatch adhesion test (tape pull) according to ASTM D3359-95 followed by submersing the printed and coated plastic substrate in distilled water at elevated temperatures around 65° C. for approximately 10 days. The adhesion of the ink and primer/hard-coat and any optional topcoat applied either on top of or beneath the hard-coat is tested about every other day up to the maximum of 10 days. An ink passes the test only if greater than 95% retention of the ink and primer/hard-coat and any optional topcoat is obtained on the $10^{th}$ day.

The inventors have found that only about 63% of available inks over-coated with a waterborne primer/hard-coat system will pass the aforementioned water immersion test. The primary failure mode is delamination of the primer/hardcoat system from the printed ink surface. Without being limited to theory, the inventors believe that although the ink may be compatible with the application of a waterborne primer/hardcoat system, the adhesion mechanism established between the printed ink and the waterborne primer is weak and susceptible to hydrolytic attack or degradation. The resin families present in the single and plural component ink formulations that passed the water immersion tests included polyesters, polycarbonates, and acrylics. All radiation curable ink formulations comprised of acrylate-based resins were found to fail this test.

Another form of an adhesion test is represented by the Cataplasma-like and full Cataplasma tests. These two tests are identical in sample preparation and exposure conditions with one exception. The Cataplasma-like test evaluates the appearance and adhesion properties of the printed ink and applied coatings. The full Cataplasma test evaluates the performance of a standard adhesive system used by the glazing industry when applied over the printed ink and coating system. In other words, the full Cataplasma test provides a method for performing an adhesive peel test for window bonding systems and a cross-hatch adhesion test, while a Cataplasma-like test provides only cross-hatch adhesion results. The environmental conditions utilized in the Cataplasma test are considered by those skilled in the art as being extremely severe. Thus very few inks and coatings are known to be able to survive or pass this test.

The full Cataplasma test includes applying the following adhesive primers and adhesive: (1) BETASEAL 43518—Clear Primer, (2) BETASEAL 48520A—Black Primer, and (3) BETASEAL 57302—Urethane Adhesive (Dow Automotive, Michigan) to the automotive glazing panel. Alternatively, the following adhesive primers and adhesive can be utilized: (1) BETAWIPE VP 04604—Clear Primer, (2) BETAPRIME 5071—Black Primer, and (3) BETASEAL 1815—Urethane Adhesive also manufactured by Dow Automotive. The automotive glazing panel should be large enough to apply two adhesive beads on areas to be tested (each about one inch wide and no less than about 9 inches in length) and two adhesion crosshatches (one for reference on the transparent area and one on the printed or inked area) which are applied post-exposure. For more details regarding the test protocol one can refer to Dow Automotive AG—Test method No 039E Cataplasma Treatment which is known in the art and is hereby incorporated herein. The Cataplasma test as described herein has been modified to be applicable for plastic substrates.

A pressure sensitive adhesion tape is applied to the top of the automotive glazing panel at every 40 cm interval. In this embodiment, no adhesive primers are applied to the top 40 cm of the glazing panel in order to create over-hang for the adhesive bead. The clear primer is then applied perpendicular to the tape overlapping multiple strips of tape. The black primer is then applied. The tape is removed after the black primer has set-up, taking about 1 to 2 minutes. A minimum of about 30 minutes to 24 hours of dry time is allowed before moving on to the next step. With an electric caulk gun, the adhesive bead is applied to the black primer. The caulk is allowed to cure for about 96 hours prior to testing. After the adhesive bead has cured, an adhesive peel test on one bead is performed. Another adhesive bead applied in the same manner should be tested after exposure to the environmental conditions set forth in the Cataplasma test. The length of the bead and the amount of adhesive present is measured.

If an automotive glazing panel fails the pre-exposure peel, it is removed from further testing. The automotive glazing panels are washed using IPA and dried using a cheese cloth. Then the glazing panel is wrapped with cotton matting, and placed into a polyethylene bag. The cotton matting is soaked with deionized water equal to about 10 times the weight of the cotton. The bag is sealed and placed in an oven preheated to about 70° C.±2° C. The glazing panels remain in this oven for about 7 days. The panels are then placed into a freezer at about −20° C.±2° C. for about 3 hours. After about 3 hours, the glazing panels are removed and placed into a conditioning room (23±2° C.) where they will reach thermal equilibrium after about 2 hours. After conditioning, the previously described steps are repeated for the adhesive peel of the second exposed adhesive bead. A crosshatch adhesion test is performed over both the transparent surface and the printed or inked surface of the automotive glazing panel.

System ratings, as provided in Table I, are used to determine the amount of cohesive failure within the adhesive bead. Any rating below a 4B (80%) in this test is considered a failure. The areas on the bead where there is no primer (e.g., where the tape was located) are not included in the measurement of the system rating. The appearance of the automotive glazing panel is also recorded in this test using the categories described in Table 2. For the automotive glazing panel to pass the full Cataplasma test, the entire system (i.e., plastic substrate/ink/primer/hard-coat/optional topcoat) will preferably need to exhibit a high level of hydrolytic stability at different temperatures and moisture conditions.

TABLE I

| Coding System Ratings | |
|---|---|
| 5: | 100% Cohesive Failure |
| 4A: | 90–99% Cohesive Failure |
| 4B: | 80–89% Cohesive Failure |
| 3: | 60–79% Cohesive Failure |
| 2: | 40–59% Cohesive Failure |
| 1: | 20–39% Cohesive Failure |
| 0: | 0–19% Cohesive Failure |

TABLE II

Adhesive delaminates from the substrate
When cutting the adhesive bead, delamination occurred at the incision
The adhesive bead remained tacky or contained tunnels because cure time was too short
Layers of the coating system separate (i.e. coating, ink, etc)
Bubbles in the primer next to adhesive bead
Observable haze
Spontaneous Delamination
The presence and type of microcracking
White spots/whitening
Blisters
Bubbles in primer next to adhesive bead
Milky The inventors have unexpectedly found that an ink having a blend of specific polycarbonate resins and polyester resins within a certain range is able to survive all OEM testing including water immersion, Cataplasma-like, and full Cataplasma, and were found to be compatible with a primer/hardcoat system having at least 10 wt % water as a solvent. The polyester resin in the ink that passed the OEM tests is a mixture of saturated polyesters, which are either straight or branch-chained aliphatic or aromatic polymers. These polymers may contain either hydroxyl or carboxyl groups that form films via condensation polymerization with other resins (e.g., amino formaldehyde, melamine, polyisocyanates, etc.) that contain complimentary reactive groups. Saturated polyesters are made from the polymerization of various alcohols (di-, tri- & tetra-hydric alcohols) and acids (or acid anhydrides), such as orthophthalic anhydride, terephthalic acids, and trimellitic anhydride. Commonly, an excess of polyol is used, thereby, providing excess hydroxyl functionality in the final resin. It is known that some polyols, such as 2,2,4-trimethyl, 1,3-pentanediol (TMPD), 1,4-cyclohexane dimethanol (CHDM), neopentyl glycol (NPG), and trimethylol propane (TMP) give more hydrolytically stable systems than do ethylene glycol or glycerol. If excess acid is used as a raw material, the resulting resin will contain carboxylated functionality.

The polycarbonate ink that passed the OEM tests contains a high temperature polycarbonate resin. This polycarbonate resin used in inks is suitable for in-mold decoration (IMD) with a polycarbonate molded substrate. The polycarbonate resin is based on geminally disubstituted dihydroxydiphenyl cycloalkanes. The resin may contain bifunctional carbonate structural units or hydroxyl groups. The polycarbonate backbone may be aliphatic or aromatic, as well as linear or branched. The hydroxyl groups present in the binder may be obtained from the alcoholysis of diphenyl carbonate with a polyol, such as an alkylene diol or an alkylene ether diol. Other suitable diols or diphenols include dihydroxydiphenyl cycloalkanes, such as 2,2-bis-(4-(2-hydroxypropoxy)phenyl)-propane and 1,1-bis-(4-hydroxyphenyl)-3,3,5-trimethyl cyclohexane. A variety of other polyols containing more than two hydroxyl groups, such as trimethyol propane, glycerine, or pentaerythritol may be incorporated.

In order to promote additional cross-linking between the polycarbonate and polyester resins, the formulated ink preferably contains a small amount of an isocyanate additive. The solvent preferably used in the ink is a mixture of aromatic hydrocarbons and dibasic acid esters. In this embodiment, the blended ink is characterized by about 1.9% to 13.2% polycarbonate resin, about 5.4% to 34.2% polyester resin and about 0.1% to 5.0% isocyanate additive and about 20.7% to 84.3% solvent. The ink may be formulated with a higher solids percentage than described above for storage stability and shelf-life, and then "let down" or decreased in solids content to the parameters described above by the addition of solvent immediately prior to use. Additionally, the formulated ink may contain about 3.6% to 38.2% colorant pigment, about 0.0% to 45.2% opacity enhancing filler, and 0.0% to 1.5% dispersant.

The ink may be prepared from raw materials using dispersion techniques known to those skilled in the art, such as but not limited to ball mills, roll mills, attritor mills, and high speed blade mixers. The ink may be prepared by blending two ink formulations together in a certain ratio. Additional components not present in either of the two ink formulations, such as an isocyanate additive, dispersants, fillers, and pigments may be added to the formulation by the dispersion techniques described above. The inventors have found that the ratio of the polyester ink to the polycarbonate ink has preferably a weight ratio of less than about 100:0 and greater than about 50:50.

The composition associated with the solids left in the applied and dried/cured print is about 49% to 72% of the polyester ink and about 12% to 18% of the polycarbonate ink. The solids weight percent for the isocyanate additive incorporated into this blend is about 6% to 10%. This ink composition may also optionally contain up to about 1.5% of an additional surfactant and up to about 30% of additional fillers or pigments.

The polycarbonate ink (Noriphan® HTR, Pröll KG, Germany) used in the above mentioned blend contains a mixture of polycarbonate resin and high temperature stable pigments dispersed in ethylbenzene, solvent Naphtha (light aromatic), 1,2,4-trimethylbenzene, xylene isomers, diacetone alcohol, mesitylene, n-butyl alcohol, and various esters.

The polyester ink (8400 Series CVIM, Nazdar Inc., Kansas) comprises a polyester resin mixture (19-33%), TiO2 (0-38%), carbon black (0-11%), gamma-butyrolactone (4-10%), aliphatic dibasic acid ester (4-8%) and colorant pigment (0-11%) dispersed in petroleum distillate (14-28%), cyclohexanone mixture (11-21%), naphthalene (<4%), silicon dioxide (0-6%), barium sulfate (0-5%), and kaolin clay (0-3%).

The colorant pigment in the ink is preferably carbon black although other inorganic and organic colored pigments may be utilized. Such colorant pigment may include, but not be limited to carbon black, copper phtahocyanine blue, dioxazine violet, quinacridone magenta, azo diarylide yellow, rutile titanium dioxide (white), perylene red, molybdate orange, yellow iron oxide, chromium green oxide, or cadmium orange. Special effect pigments, such as pearlescent pigments and metallic flakes may be incorporated into the formulation.

The isocyanate additive used is preferably an aromatic polyisocyanate, such as the NB-70 catalyst (Nazdar Inc., Kansas). This particular isocyanate is dispersed in propylene glycol methyl ether acetate (40%, also called PM acetate) although other solvents could be utilized. The isocyanate can also be other aromatic or aliphatic diisocyanates, such as polymeric hexamethylene diisocyanate (HMDI), isophorone diisocyanate (IPDI), 2,6-tolylene diisocyanate (TDI), diphenylmethane diisocyanate (MDI), or xylene diisocyanate (XDI) among others.

The optional dispersant may be an ionic or nonionic dispersing agent. Such surfactants include but are not limited to metallic soaps, sulfonates, phosphate esters, fatty acid esters, fluoroaliphatic polymeric esters, titanate or ziconate or aluminate coupling agents, organomodified polysiloxanes, block copolymers of poly(alkylene oxide), and commercial proprietary surfactants, such as Hypermer® and Solsperse® hyperdispersants (ICI Americas, Inc.). The optional surfactant is preferably an organomodified polysiloxane, also called a polyether siloxane copolymer, such as Tego® Wet KL 245 (Goldshmidt Chemical Corp., Virginia).

The optional opacity enhancing fillers may be inorganic in nature, such as alumina, silica, titanium dioxide, magnesium silicate (talc), barium sulfate, calcium carbonate, aluminum silicate (clay), calcium silicate (wollastonite), aluminum potassium silicate (mica), metallic flakes, etc., or organic in nature, such as furnace black, channel black, and lamp black among others. Highly refractive fillers, such as titanium dioxide, are preferred for increasing opacity due to their small mean particle size of less than 1.0 micrometers. For example, titanium dioxide having a mean particle size of 0.36 micrometers is available as Ti-Pure® R-706 (DuPont Titanium Technologies, Delaware).

The following specific examples are given to illustrate the invention and should not be construed to limit the scope of the invention.

Example 1

Water Immersion Testing

Polycarbonate substrates were screen printed with a variety of inks (see Table 3) that were found to be compatible with a waterborne acrylic primer and silicone hard-coat (Exatec® SHP 9X). Each of the inks was mixed and prepared according to the manufacturer's technical data sheet. In each case, the screen printing of the ink onto the polycarbonate substrate produced a "dry" ink thickness of about 8 micrometers after the ink was cured. Each ink print was dried or cured according to the manufacturer's recommended conditions.

Each of the printed polycarbonate substrates was then flow coated using Exatec® SHP 9X acrylic primer and Exatec® SHX silicone hard-coat (Exatec LLC with General Electric Silicones). The flow coating of the acrylic primer was performed at room temperature and atmospheric pressure. The flow coating and cure of each applied coating was performed according to the manufacturer's recommended conditions.

Each of the coated polycarbonate substrates were subjected to water immersion testing as previously described with adhesion of the coatings monitored using two crosshatches, one crosshatch over the printed area, and a second crosshatch over the transparent portion of the polycarbonate substrate. The second crosshatch was used as a control to validate the integrity of the coatings. The results obtained for each crosshatch over the printed area is provided in Table 3. An ink passes the test only if greater than 95% retention of the ink and primer/hard-coat is obtained on the $10^{th}$ day of water immersion.

As shown in Table III below less than 63% (12 out of 19) of the inks tested passed the water immersion test. The delamination of the coatings was determined via failure analysis to occur at the ink/primer interface. The single and plural component inks that passed the water immersion test with the waterborne primer represented about 86% (12 out of 14) of the entire number of inks evaluated.

As seen from the results obtained above, inks that contained a polycarbonate resin (Ink #'s 6-9) or a polyester resin (Ink #'s 1 & 3) were found to pass the water immersion test after being coated with a waterborne primer/hard-coat system along with a few inks comprising acrylic, 2-pack acrylic, Acrylic+cellulose acetate propionate, PVC+acrylic resins (Ink #'s 2, 5, 11, 12, 13, 14). All radiation curable inks (Inks #'s 15-19) failed the compatibility test.

TABLE III

|   | INK TYPE (DILUENT) | MANUFACTURER | RESIN TYPE | TEST RESULT |
|---|---|---|---|---|
| 1 | 9600 Series | Nazdar Company (Kansas) | Polyesters | PASS |
| 2 | 70000 | Nazdar Company (Kansas) | Acrylic | PASS |
| 3 | 8400 Series | Nazdar Company (Kansas) | Polyesters | PASS |
| 4 | Flexiform C37 | Coates Screen (Illinois) | Urethane | Fail |
| 5 | ZM-65/NT-NEU | Coates Screen (Illinois) | 2-pack acrylic | PASS |
| 6 | Noriphan HTR 093 | Pröll KG (Germany) | Polycarbonate | PASS |
| 7 | Noriphan HTR 952/093 | Pröll KG (Germany) | Polycarbonate | PASS |
| 8 | Noriphan HTR 952/050/093 | Pröll KG (Germany) | Polycarbonate | PASS |
| 9 | Noriphan HTR 952/050 | Pröll KG (Germany) | Polycarbonate | PASS |
| 10 | Sorte P948 (P090) | Pröll KG (Germany) | Vinyl-acrylic | Fail |
| 11 | Noristar PG948 (PS090) | Pröll KG (Germany) | Acrylic + cellulose acetate propionate | PASS |
| 12 | Noristar PG948 | Pröll KG (Germany) | Acrylic + cellulose acetate propionate | PASS |
| 13 | Thermo-Jet 948 | Pröll KG (Germany) | PVC + acrylic | PASS |
| 14 | Noriprint PS948 (PS90/002) | Pröll KG (Germany) | Acrylic + cellulose acetate propionate | PASS |
| 15 | 071-009 | Sericol (Great Britian) | acrylate mixtures | Fail |
| 16 | Thermoform TF-4450 | Polymeric Imaging Inc. (Missouri) | acrylate mixtures | Fail |
| 17 | MSK-1019 | Nor Cote International Inc. (Indiana) | acrylate mixtures | Fail |
| 18 | UV Vinex 3578/3579 | Nazdar Company (Kansas) | glycol ether acrylate, acrylate mixtures | Fail |
| 19 | UV Vinex 3478/3479 | Nazdar Company (Kansas) | glycol ether acrylate, acrylate mixtures | Fail |

Example 2

Polycarbonate (PC) and Polyester (PE) Ratios

Several single components inks were formulated using a combination of polycarbonate and polyester resins prepared by blending various ratios of a polycarbonate ink with a polyester ink. The inventors believed that an ink comprising a combination of these two resins would have the best chance of passing the Cataplasma test protocol.

Table IV represents the ink compositions that were made by blending three ratios of a polycarbonate ink (Noriphan® HTR-952, Pröll KG, Germany) with a polyester ink (8452, Nazdar Inc., Kansas) using a medium speed blade mixer. After the two inks were blended, additional solvent (097/003 retarder, Pröll KG & RE196 retarder, Nazdar Inc.) were mixed in with the ink prior to the addition of an isocyanate additive. The aromatic isocyanate additive (NB-70, Nazdar Inc., Kansas) was the last component added to the blended ink. The blended ink was allowed to stand still for about 15-20 minutes prior to the start of printing in order for any air incorporated into the ink during the mixing process to be reduced or removed.

TABLE IV

| # | PE:PC ratio | polyester (gms) | polycarbonate (gms) | 10% Solvent (gms) | 4% isocyanate (gms) |
|---|---|---|---|---|---|
| 20 | 80:20 | 356.0 | 89.0 | 35.0 | 20.0 |
| 21 | 50:50 | 222.5 | 222.5 | 35.0 | 20.0 |
| 22 | 20:80 | 89.0 | 356.0 | 35.0 | 20.0 |

Each of the inks (Ink #'s 20-22) described above was applied via screen printing to polycarbonate substrates and then over-coated with the waterborne Exatec® SHP 9X primer and Exatec® SHX hard-coat system. In this example, an optional "glass-like" topcoat was deposited onto the surface of the hard-coat system via the use of Plasma Enhanced Chemical Vapor Deposition. This combination of primer, hard-coat, and topcoat represents the Exatec® 900 glazing system. The coated substrates were then subjected to water immersion and Cataplasma-like testing as previously described.

As seen in Table V, a blend of a polyester (PE) to polycarbonate (PC) ratio of 80 PE:20 PC (Ink #20), unexpectedly passes all test requirements for both water immersion and Cataplasma tests. As seen from the above table an opposing blended ink #22 with a PE:PC ratio of 20:80 fails most of the tests. Multiple samples of blended ink #21 with a PE:PC ratio of about 50:50 was observed to be borderline between passing and failing all test requirements. All ink blends outside of the range described above were found to fail either water immersion or Cataplasma-Like testing.

TABLE V

| # | PE:PC ratio | Water Immersion (% retention) |
|---|---|---|
| 20 | 80:20 | PASS |
| 21 | 50:50 | PASS/FAIL Mixture |
| 22 | 20:80 | Fail |

TABLE V-continued

| | | CATAPLASMA-Full | | CATAPLASMA-LIKE | |
|---|---|---|---|---|---|
| # | PE:PC ratio | Optical Appearance | % Retention | Optical Appearance | % Retention |
| 20 | 80:20 | PASS | PASS | PASS | PASS |
| 21 | 50:50 | PASS | PASS/Fail | PASS | PASS/Fail |
| 22 | 20:80 | PASS | Fail | PASS | Fail |

Example 3

Design of Experiment for PE:PC Blends

The three ink blends (Ink #'s 20-22) described in Example 2 were optimized using a factorial Design of Experimental (DOE) approach. The experimental approach evaluated process and formulation variables of catalyst wt %, ink cure temperature and ink cure time for each blended ink. Each of the blended inks were prepared according to the procedure described in Example 2 using the catalyst weight percentage described in Table VI.

Each of the inks was applied via screen printing to polycarbonate substrates and cured according to the conditions described in Table VI. Each printed substrate was then over-coated with the waterborne Exatec® SHP 9X primer and Exatec® SHX hard-coat system according to the manufacturer's recommended procedure. In this example, an optional "glass-like" topcoat was deposited onto the surface of the hard-coat system via the use of Plasma Enhanced Chemical Vapor Deposition. This combination of primer, hard-coat, and topcoat represents the Exatec® 900 glazing system. The coated substrates were then subjected to water immersion, full Cataplasma, and Cataplasma-like testing as previously described. The test results are summarized in Table VI.

As seen in Table VI, the ink blend comprising 80:20 polyester:polycarbonate resin (Ink #20) passed all the tests at cure conditions of 100° C. for 30 minutes and 100° C. for 60 minutes. In comparison, the ink blend comprising 20:80 polyester:polycarbonate resin (Ink # 22) failed most of the tests at all cure conditions. The intermediate ink blend (Ink #21) comprising 50:50 polyester:polycarbonate resin both failed and passed the tests, thereby setting the lower limit for acceptability.

Figure 1B:
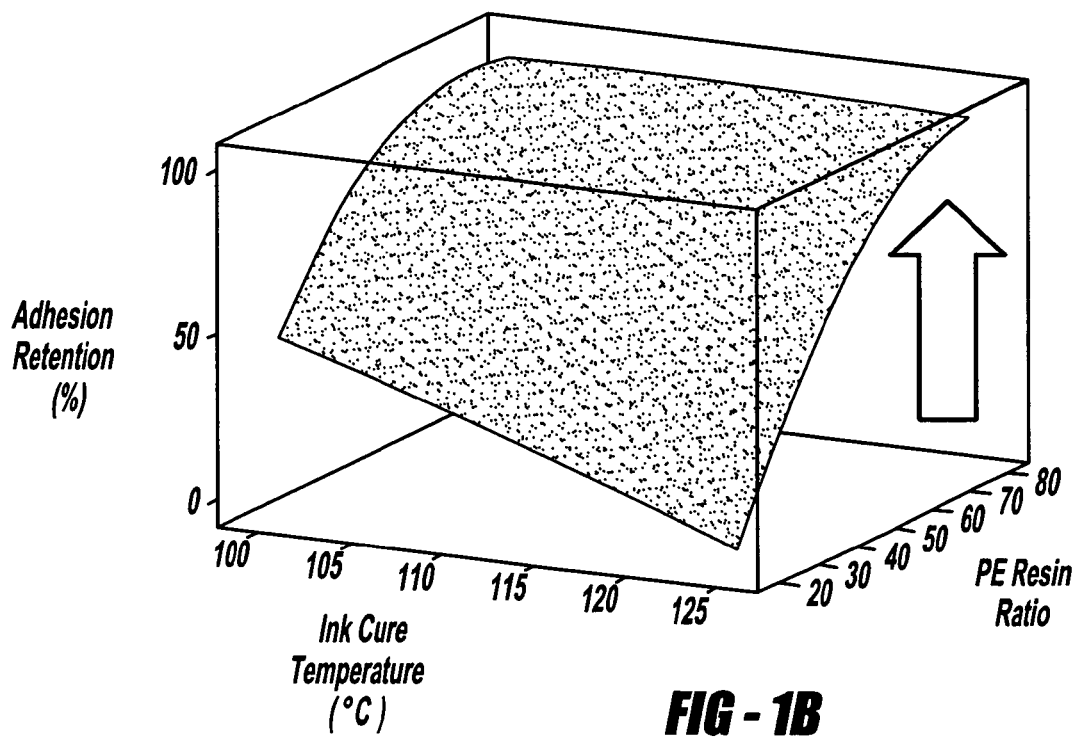
FIG. 1B is a plot of the response surface for PE to PC resin ratio, ink cure temperature, and adhesion retention in Cataplasma-like testing.
Figure 1C:
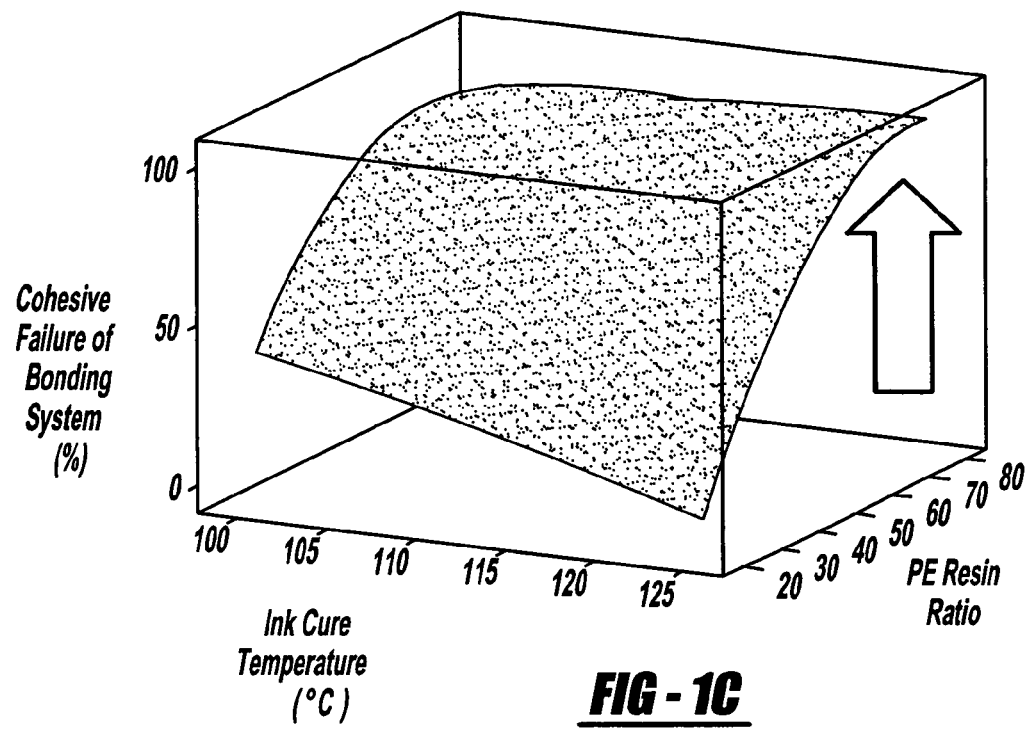
FIG. 1C is a plot of the response surface for PE to PC resin ratio, ink cure temperature, and adhesion retention in the degree of cohesive failure of the bonding system in full Cataplasma testing.
Figure 2A:
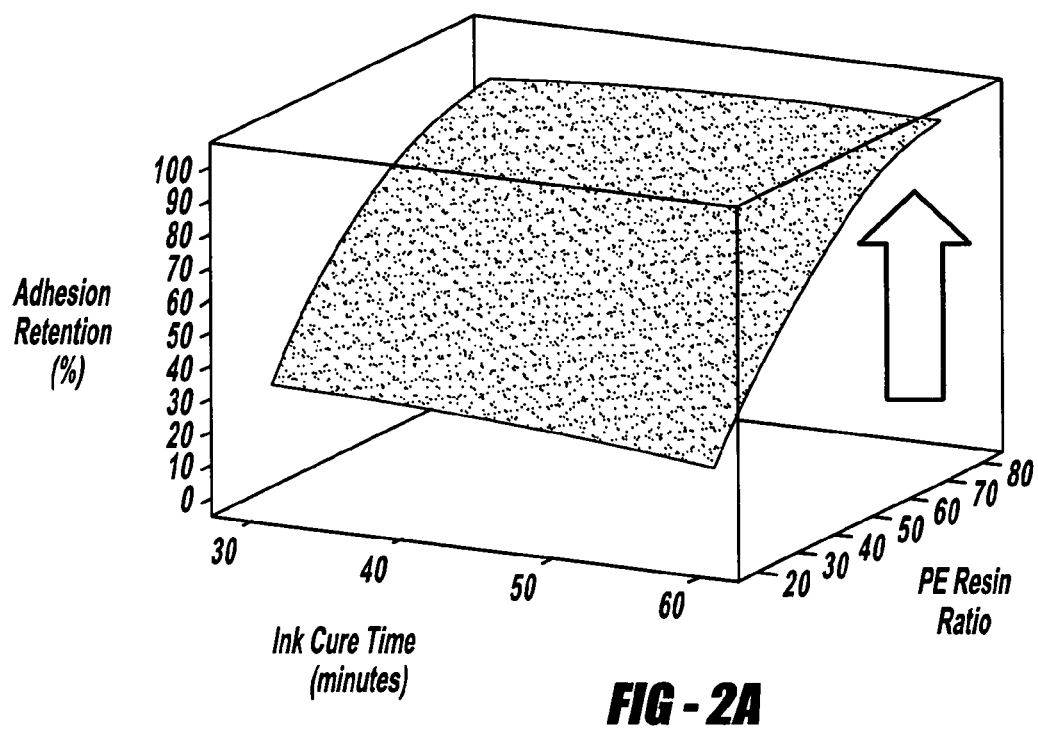
FIG. 2A is a plot of the response surface for PE to PC resin ratio, ink cure time, and adhesion retention in water immersion testing.
Figure 2B:
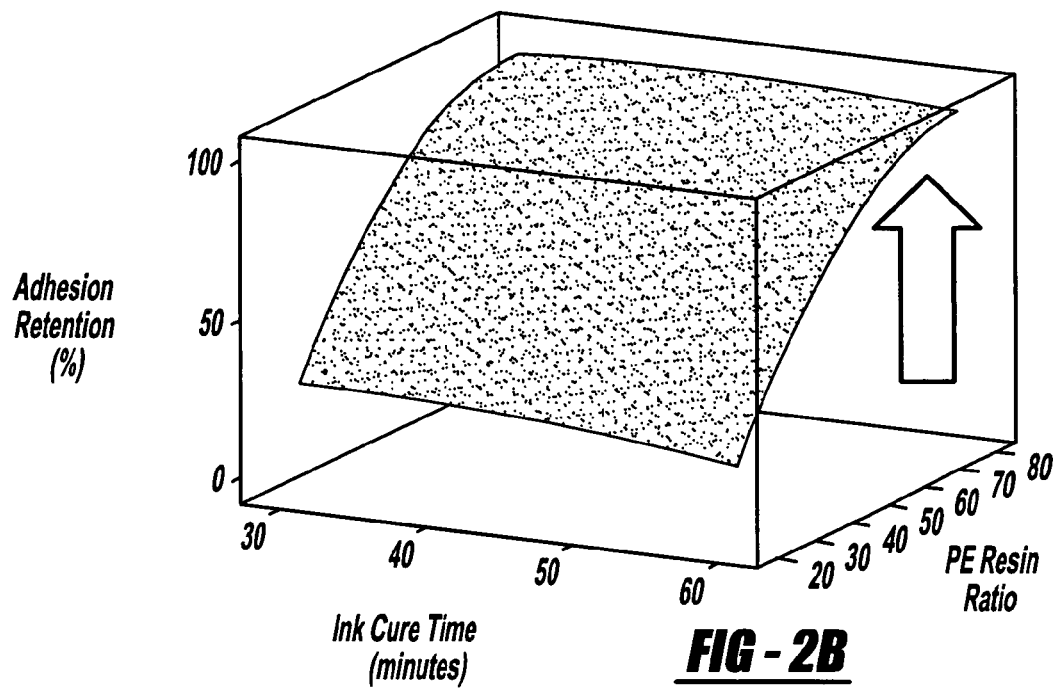
FIG. 2B is a plot of the response surface for PE to PC resin ratio, ink cure time, and adhesion retention in Cataplasma-like testing.
Figure 2C:
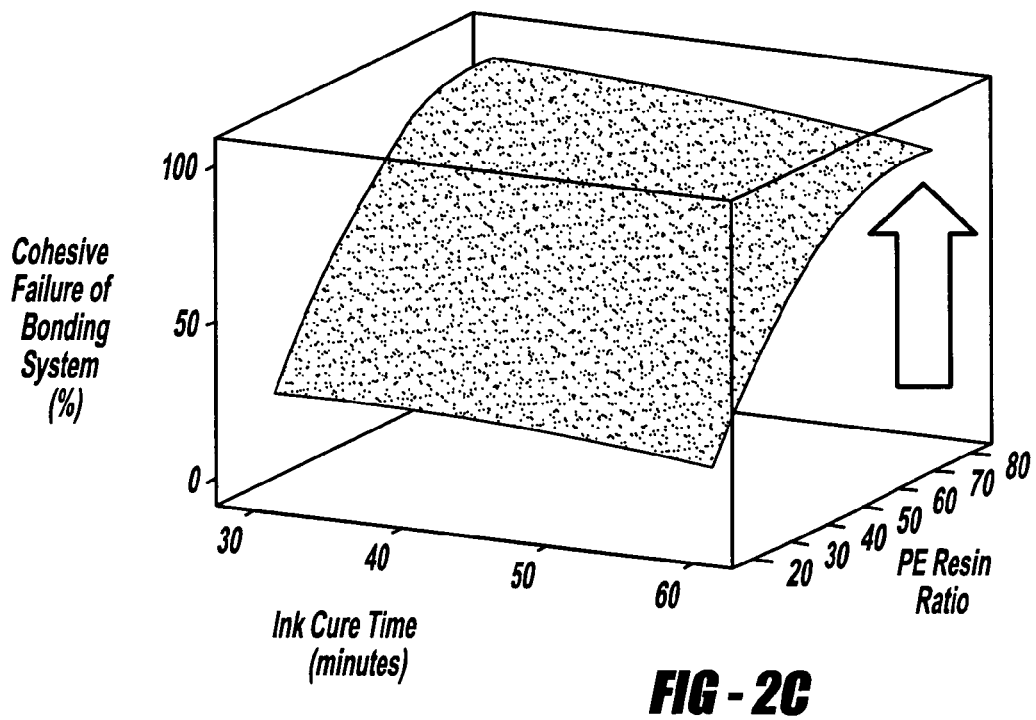
FIG. 2C is a plot of the response surface for PE to PC resin ratio, ink cure time, and adhesion retention in the degree of cohesive failure of the bonding system in full Cataplasma testing.

All of the measured results were analyzed using full ANOVA protocol, which is available in most standard statistical software packages, such as Design-Expert® (Stat-Ease Inc., Minneapolis, Minn.). The response surfaces generated in this analysis for adhesion retention in the water immersion and Cataplasma-like tests, as well as the degree of cohesive failure of the bonding system in the full Cataplasma test, are plotted as a function of (i) cure temperature and resin ratio and (ii) cure time and resin ratio in FIGS. 1(A-C) and 2(A-C), respectively. The response surface generated in each test demonstrates that over the cure temperature range of 100-125° C. (FIGS. 1A-1C) and cure time range of 30-60 minutes (FIGS. 2A-2C) that adhesion is enhanced by increasing the ratio of the polyester resin in the PE:PC blended ink.

TABLE VI

| Factor 1 Ink Type PC:PE | Factor 2 Catalyst wt % | Factor 3 Ink Cure Temperature (°C.) | Factor 4 Ink Cure Time (minutes) | 10 day Water Immersion Test | Full Cataplasma Test | Cataplasma-like Test |
|---|---|---|---|---|---|---|
| 80:20 | 2 | 100 | 30 | Fail | Fail | Fail |
| (Ink #22) | 2 | 100 | 60 | Fail | Fail | Fail |
|  | 2 | 125 | 30 | Fail | Fail | Fail |
|  | 2 | 125 | 60 | Fail | Fail | Fail |
|  | 4 | 100 | 30 | Fail | PASS | Fail |
|  | 4 | 100 | 60 | Fail | Fail | Fail |
|  | 4 | 125 | 30 | Fail | Fail | Fail |
|  | 4 | 125 | 60 | Fail | Fail | Fail |
| 50:50 | 3 | 113 | 45 | PASS/Fail | PASS | PASS |
| (Ink #21) |  |  |  |  |  |  |
| 20:80 | 2 | 100 | 30 | PASS | PASS | PASS |
| (Ink #20) | 2 | 100 | 60 | PASS | Fail | PASS |
|  | 2 | 125 | 30 | PASS | PASS | PASS |
|  | 2 | 125 | 60 | PASS | PASS | PASS |
|  | 4 | 100 | 30 | PASS | PASS | PASS |
|  | 4 | 100 | 60 | PASS | PASS | PASS |
|  | 4 | 125 | 30 | Fail | PASS | PASS |
|  | 4 | 125 | 60 | PASS | PASS | PASS |

This Example demonstrates that it is preferred for the ink to comprise a polyester to polycarbonate resin weight ratio of less than about 100:0 and greater than about 50:50 in order to pass all OEM test protocols.

A person skilled in the art will recognize from the previous description modifications and changes can be made to the preferred embodiment of the invention without departing from the scope of the invention as defined in the following claims.

What is claimed is:

1. An automotive glazing panel, the panel comprising:
   an ink printed on a plastic substrate, the ink having a synthetic resin, the synthetic resin being a polycarbonate resin, a polyester resin, or mixtures thereof; and
   a waterborne primer in a primer/hard-coat system applied on the ink and the plastic substrate, the primer including a mixture solvent comprising first and second solvents, the second solvent being selected from the group consisting of glycol ethers, ketones, alcohols, and acetates,
   a silicone hard-coat in the primer/hard-coat system applied over the primer; and
   the ink being adaptable to adhere to the surface of the substrate and compatible with the primer/hard-coat system;
   wherein compatibility is determined by the ink passing a compatibility test upon exposure to the primer/hard-coat system and the automotive glazing panel passing a water immersion test and Cataplasma test.

2. The panel of claim 1 wherein the synthetic resin contains at least one hydroxyl or carboxyl functional group such that the synthetic resin cross-links with itself to be compatible with the hard-coat while maintaining adhesion to the surface of the substrate.

3. The panel of claim 1 wherein the polyester resin is a polyester ink comprising a polyester resin mixture (19-33%), $TiO_2$ (0-38%), carbon black (0-11%), gamma-butyrolactone (4-10%), aliphatic dibasic acid ester (4-8%) and a colorant pigment (0-11%) dispersed in a solvent mixture of petroleum distillate (14-28%), cyclohexanone (11-21%), and naphthalene (<4%), silicon dioxide (0-6%), barium sulfate (0-5%), and kaolin clay (0-3%).

4. The panel of claim 1 wherein the primer is an acrylic primer.

5. The panel of claim 1 wherein the primer has a resin content of about 2% to 7% wt by weight of the primer.

6. The panel of claim 5 wherein the resin is polymethyl methacrylate.

7. The panel of claim 1 wherein the mixture solvent includes at least 50 weight percent water.

8. The panel of claim 1 wherein the mixture solvent includes at least 85 weight percent water.

9. The panel of claim 1 wherein the ink has a thickness of between about 4 to 20 micrometers.

10. The panel of claim 1 wherein the ink has a thickness of between about 5 to 8 micrometers.

11. The panel of claim 1 further comprising a topcoat deposited onto the primer/hard-coat system for enhanced performance.

12. The panel of claim 11 wherein the topcoat is selected from the group consisting of aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, silicon carbide, tantalum oxide, titanium oxide, tin oxide, indium tin oxide, yttrium oxide, zinc oxide, zinc selenide, zinc sulfide, zirconium oxide, zirconium titanate, and glass.

13. The panel of claim 12 wherein the topcoat is deposited by one of the following techniques: plasma enhanced chemical vapor deposition, ion assisted plasma deposition, magnetron sputtering, electron beam evaporation, ion beam sputtering, curtain coating, spray coating, spin coating, dip coating, and flow coating.

* * * * *